July 5, 1955  F. J. MOSS  2,712,161
METHOD OF FORMING DIPPED ARTICLES
Filed Aug. 10, 1951  3 Sheets-Sheet 1

INVENTOR.
FRANK J. MOSS
BY
Fulwider and Mattingly
ATTORNEYS.

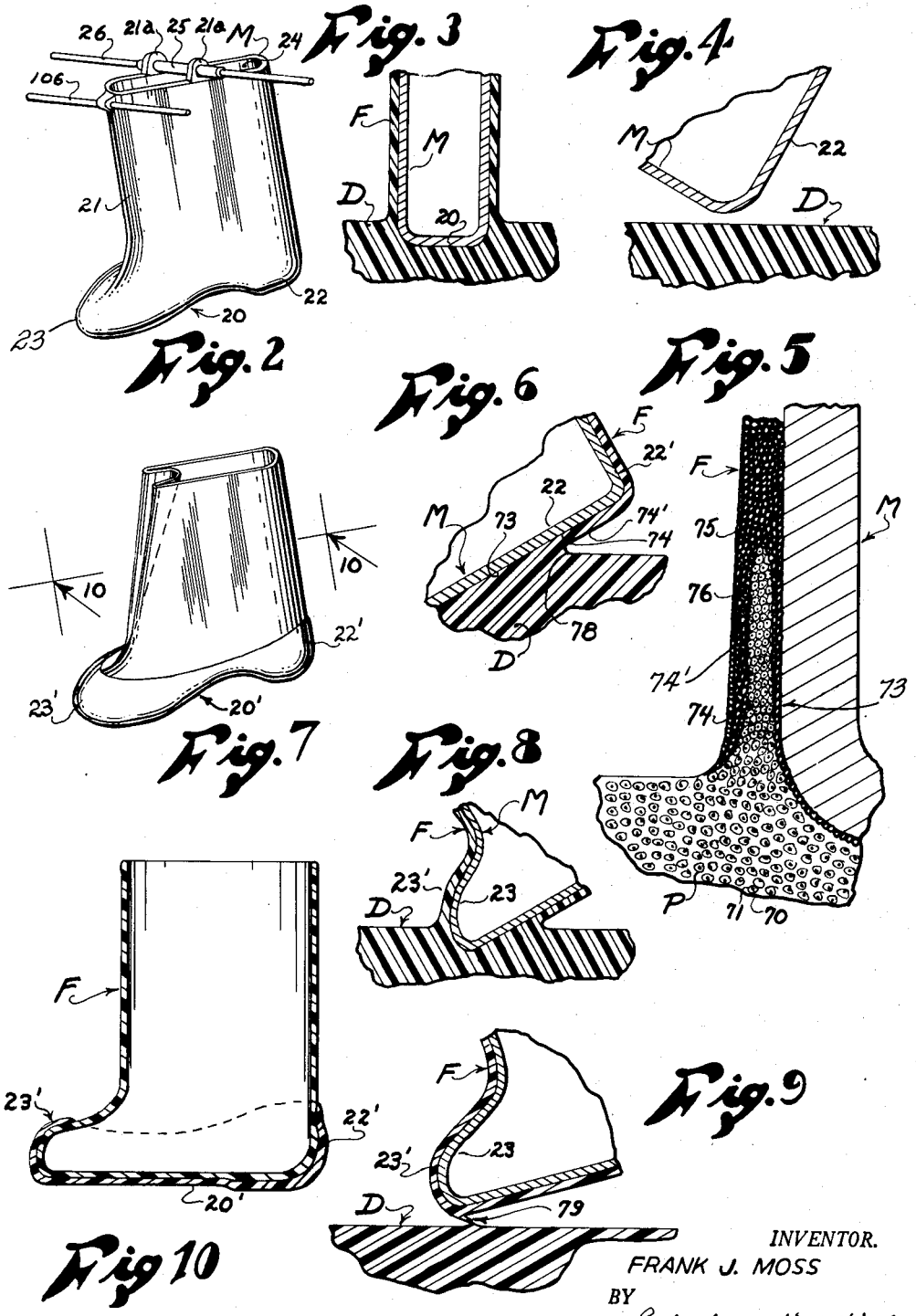

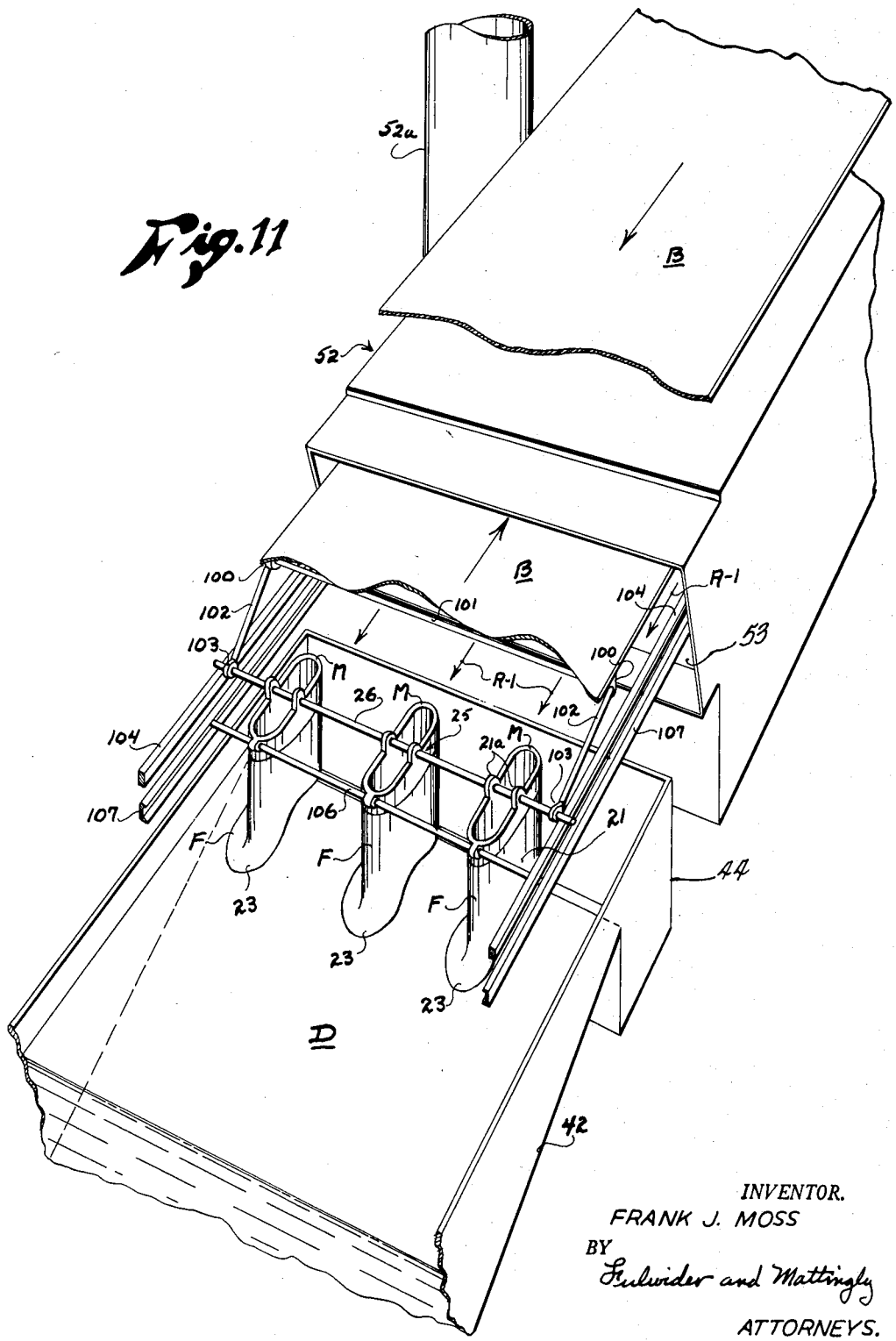

United States Patent Office 2,712,161
Patented July 5, 1955

2,712,161

METHOD OF FORMING DIPPED ARTICLES

Frank J. Moss, Sunland, Calif., assignor to Rena Bell Hardman, West Los Angeles, Calif.

Application August 10, 1951, Serial No. 241,218

5 Claims. (Cl. 18—58.7)

This application is a continuation-in-part of my copending application, Serial No. 114,174, filed September 6, 1949, now abandoned, entitled Method and Means of Forming Dipped Articles, and relates specifically to a novel method of manufacturing one-piece light-weight overshoes or other articles of compound curvature that do not lend themselves to tailoring from flat stock.

The production of hollow rubber goods by dipping operations is, of course, a relatively old art, and while ideally suited for the production of certain thin-walled rubber articles, or articles that could have the wall thicknesses built up by multiple dippings and curings, has for several reasons had but restricted commercial usage in the past.

One disadvantage inherent in prior dipping techniques has been the impossibility of obtaining single dipped films of substantial thickness and of a physical character that would withstand hard wear and abrasive action. To overcome this problem multiple dippings and curings have been employed to build up the wall thickness of the article to the desired degree, but each successive dipping operation increases the cost of manufacture and the possibility of a faulty product.

In addition, each of the steps in a multiple dipping technique is made under variable conditions which, unless closely supervised by skilled personnel, results in the dipped goods having little or no uniformity as to physical properties. Various attempts to avoid the disadvantages of multiple dipping have led to such developments as porous molds that were used in both the heated and unheated state, were coated with substances to promote coagulation of the dipped film, and sometimes had vacuum applied thereto, as well as electrical currents for various purposes. Different forms of apparatus have also been developed to dip mandrels into stationary baths of latex or hydrosol dispersions, and automatically withdraw the mandrels and subject them to various motions in an effort to obtain dipped articles of uniform heavy wall thickness.

The results attained by the above mentioned rubber techniques have been disappointing as to uniformity of thickness of the deposited film and the physical characteristics thereof when applied to the dipping in resinous dispersions. However, the disadvantages and obstacles inherent in the previously available dipping techniques have been overcome by the present invention which provides a dipping process for plastics which permits the securing of single cured film of a thickness up to seventy-five thousandths of an inch and better. The film resulting from the use of this technique has sufficient resiliency, tenacity, and resistance to cutting and abrasive action that it may be used in the forming of overshoes or other articles of compound curvature not advantageously fabricated from flat stock.

A major object of the present invention is to provide a dipping process that may be used to produce a one-piece light-weight overshoe that has a pliable upper wall portion in which a foldable flap is embodied, with the flap when folded in an upwardly extending position drawing the upper wall portion snugly around the ankle of the wearer in a weather protecting position, the increased rigidity of the fold assisting in maintaining the upper portion in position.

Another object of the invention is to provide a dipping process that permits the production of a transparent or translucent overshoe which has no odor, and has a reinforced sole portion around which the upper side wall of the overshoe may be wound or folded to form a compact package that may be carried in a woman's purse.

A further object of the invention is to furnish a dipping process that permits variations in wall thicknesses to be made in a single dipping operation.

Yet another object of the invention is to provide a dipping process that lends itself to the continuous volume production of one-piece overshoes and the like at a cost that permits them to be retailed in competition to other weather protecting footwear.

A further object of the invention is to provide a dipping process that is simple in operation, produces dipped goods of uniform appearance and physical characteristics, does not require highly skilled personnel for its successful operation, and has great flexibility as to the quantity and quality of the products produced thereby.

A still further object of the invention is to provide a dipping process in which overshoes are formed on constantly moving hollow mandrels fabricated from metal having a high degree of heat conductivity, to concurrently subject each portion of the film on the mandrels to substantially the same temperature during the dipping and curing operations.

Yet another object of the invention is to provide a dipping process in which mandrels are continuously moved with such velocity that the heat imparted to them in the intermediate and final curing of the dipped overshoes can be utilized in assisting to build up certain portions of greater thickness than the balance of the structure of the overshoe.

A further object of the invention is to provide a dipping process in which mandrels are dipped and withdrawn from the resinous bath in a novel manner to minimize any mechanical shock to the film adhering thereto, with this operation being carried out in a bath flowing in the same direction as mandrels are moving and at a rate relative thereto whereby a film of the desired thickness may be deposited on said mandrels.

Yet another object of the invention is to provide a dipping process in which a bath of resinous material is in constant circulation to minimize the formation of dried skin on the surface thereof and which removes such skin as it forms.

A still further object of the invention is to furnish a resinous bath, the temperature and viscosity of which is adjusted as it circulates to provide uniform dipping conditions.

These and other objects and advantages of the invention will become apparent from the following description of a preferred method of carrying out the dipping and curing operations, and from the drawings, in which:

Figure 2 is a perspective view of one of the hollow mandrels used in the dipping process;

Figure 3 is a fragmentary transverse vertical cross section of a lower portion of the mandrel being withdrawn from the resinous dispersion;

Figure 4 is a fragmentary vertical cross-sectional view of the heel portion of a mandrel, showing the manner in which it is brought into contact with the surface of the dispersion to create minimum mechanical disturbance thereto;

Figure 5 is an enlarged fragmentary vertical sectional view of a portion of a mandrel being withdrawn from a resinous dispersion to show the manner in which a thick film is deposited thereon;

Figure 6 is a fragmentary vertical cross-sectional view of the heel portion of a mandrel as it is withdrawn from the resinous dispersion showing the manner in which meniscus and surface tension of the bath serves to hold the film deposited on the sole of the mandrel to a uniform thickness;

Figure 7 is a perspective view of one form of overshoe that may be formed on the mandrel shown in Figure 2;

Figure 8 is a fragmentary vertical sectional view of the toe portion of a mandrel being withdrawn from the resinous dispersion;

Figure 9 is a vertical cross-sectional view of the toe portion of a mandrel withdrawn from the dispersion, and just prior to the complete separation of the liquid from the mandrel toe;

Figure 1:
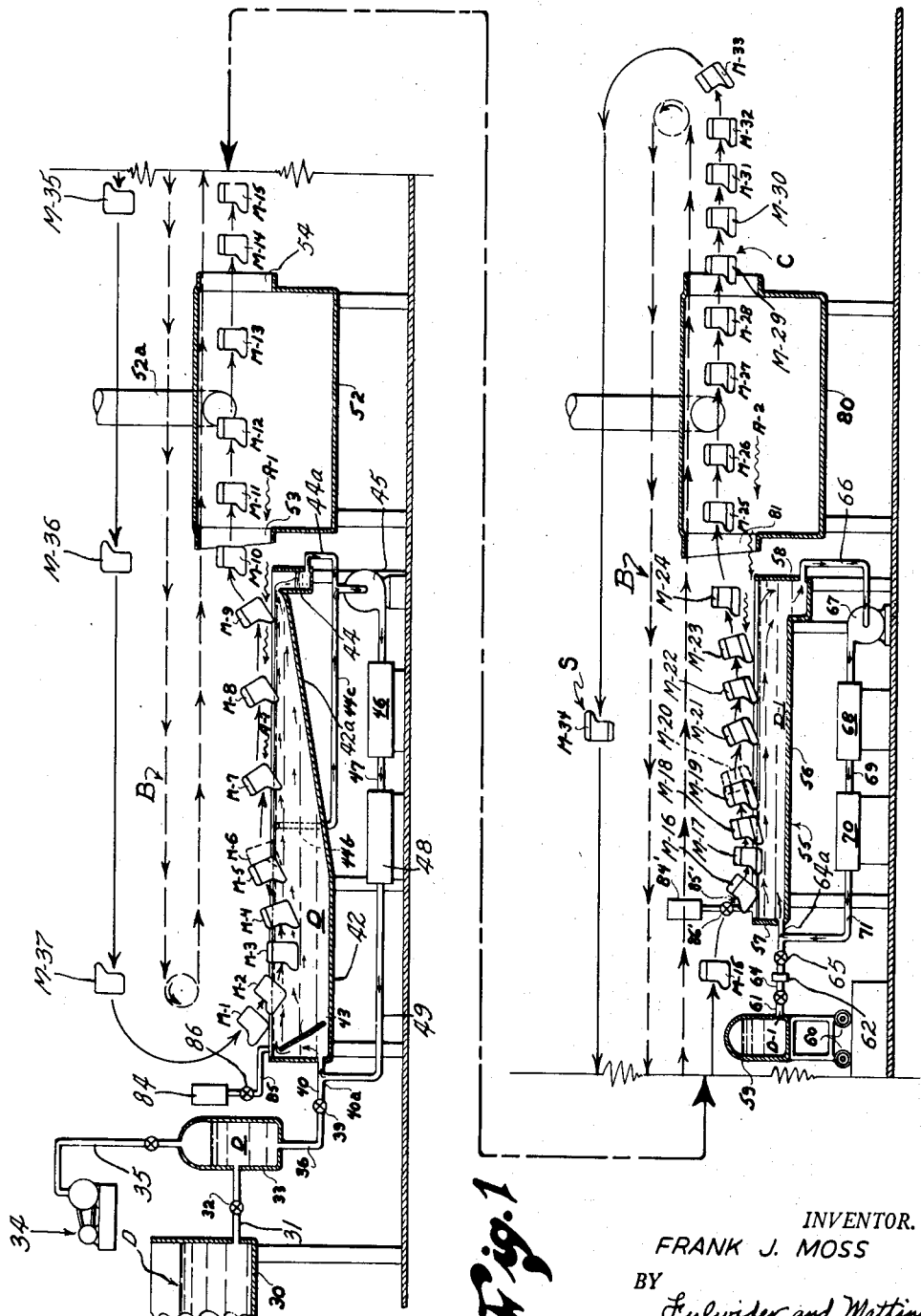
Figure 1 is a diagrammatic flow chart of the dipping process for forming a one-piece overshoe.

Figure 10 is a vertical sectional view of the cured dipped overshoe as it is stripped from the mandrel, showing the uniform side wall structure, the thickened sole structure and the reinforced heel portion; and, Figure 11 is a perspective view of the mandrel-supporting endless belt, a portion of the first dip tank, a portion of the oven, and the guide rails that automatically pivot the mandrels through the sequence of positions shown in Figure 1.

Referring now to the drawings for the general arrangement of one form of apparatus that can be used in the method of my invention to produce the overshoes shown in Figures 7 and 10, it will be seen that a number of mandrels M are employed. Each of the mandrels M, as may be seen in Figure 2, is formed in the shape of a hollow overshoe having a flat sole 20 from which an elongated tubular member 21 extends upwardly to define a heel portion 22 on the rearward end thereof, and a short forwardly extending toe portion 23 on the forward end. Tubular member 21 terminates in an elongated opening 24. The mandrels are preferably fabricated from copper substantially one thirty-second of an inch in thickness. If desired, the exterior of the mandrels may be plated with a suitable metal such as chromium or nickel to provide a surface of maximum smoothness and to avoid oxides forming thereon.

A sleeve 25 is transversely positioned in openings formed in two laterally spaced lugs 21a extending upwardly from the mandrel, and is rigidly affixed to the lugs by brazing or other conventional means. A rod 26 extends through the sleeves 25 of several mandrels to pivotally support them in laterally spaced positions, as may be seen in Figure 11. Suitable conveyor means are provided to movably support a plurality of rods 26 in spaced relationship thereon to move the rods in such a manner that each of the mandrels passes through the sequence of events shown in Figure 1.

Prior to discussing the apparatus shown in Figures 1 and 11, the composition of the fluid in which the dipping operation takes place should be considered. This material is a dispersion D comprised of a large number of minutely ground particles P of a curable resin such as polymerized vinyl chloride or a co-polymer of vinyl chloride and vinyl acetate suspended in a mixture of hydrocarbon diluent and a plasticizer for said resinous material. Dispersions of this type are commonly known as organosols. The plasticizer has an elasticizing action on the resinous material which transforms hard brittle material such as polymerized vinyl chloride and vinyl acetate into a resilient material when present during the curing operation. Dioctyl phthalate has been found to be quite satisfactory as a plasticizer when used with vinyl polymers and co-polymers.

After being milled to the desired size the outer surfaces of the vinyl polymer or co-polymer particles are expanded by the solvent action of a suitable fluid, and due to their lessened density will remain in suspension indefinitely. Dioctyl phthalate is an active solvent for polymerized vinyl acetate and vinyl chloride above 100° F., increasing in activity as the temperature rises, but has little or no solvent action on these resinous materials at room temperature. In curing the dipped film, heat causes the fusion and complete intermingling of the vinyl resin and plasticizer into a homogeneous resilient sheet material, the physical characteristics of which are dependent on a number of factors that will hereinafter be discussed in detail. It will be apparent that the maximum thickness of a cured film will be obtained when the deposited film contains the maximum number of particles, each of these particles being formed with a core of vinyl resin that has an exterior swollen surface of a jelly-like nature formed of vinyl resin and plasticizer.

In practicing the method of my invention a dispersion D having the last mentioned physical characteristics may be placed in a storage tank 30 from which a discharge pipe 31 having a control valve 32 therein extends to a feed tank 33. A vacuum pump 34 is connected by a pipe 35 to the interior top portion of feed tank 33. After feed tank 33 has been charged with a dispersion, pump 34 is operated anywhere from two to eighteen hours to maintain a vacuum on the dispersion, which removes air bubbles entrained therein as well as light fractions of hydrocarbons that may be present in the extender forming a part of the dispersion. Failing to remove either entrained air bubbles or light hydrocarbon fractions from the dispersion results in the formation of bubbles and blisters in dipped goods formed from the dispersion when the goods are subjected to a drying or curing heat.

A discharge pipe 36 extends from the lower portion of feed tank 33 to a control valve 39 which is connected by a pipe 40 to one end 41 of an elongated dipping tank 42. Tank 42 has a baffle 43 positioned within the confines thereof adjacent the discharge end of pipe 40 to direct fluid entering the tank upwardly to follow the course indicated by the arrows in Figure 1 for reasons that will hereinafter be explained. Dipping tank 42 has a forwardly and upwardly sloping bottom portion 42a (Figure 1) to cause increased rate of flow of the fluid. A sump 44 at the end of tank 42 has a pipe 44a leading therefrom to a pump 45 and then to a cooler 46. The dispersion D is discharged from cooler 46 through a pipe 47 to a filter 48 and then through a pipe 49 to junction 40a. Junction 40a is a T connection in pipe 40 which permits the filtered and cooled dispersion to be returned to the dip tank 42. Thus the dispersion D in tank 42 is constantly circulated, filtered and cooled.

Two laterally spaced vertical pipes 44b are disposed within the confines of tank 42 and are connected by a pipe 44c to the pump 45. The inlets to the pipes 44b are under the fluid surface of dispersion D in tank 42, and as fluid is drawn into the pipes 44b, skin that may have formed on the surface of the dispersion is passed directly to the pump 45. That portion of the skin formed on the dispersion surface which escapes being drawn into the inlets of pipes 44b passes into the sump 44 and thence to the pump 45. A considerable portion of the skin is sufficiently broken up by the pump and returns to the tank in good condition for dipping. Removal of dried skin from the surface of dispersion D is of the utmost importance, for unless removed it may be deposited on the mandrels M, resulting in imperfect goods.

A curing oven 52 is disposed directly ahead of the forward end of dip tank 42, and has a rearward open end portion 53. Hot air A-1 is circulated from the forward open end 54 of the oven through the rearward open end 53 thereof in a direction counter to that of the forwardly moving mandrels M, as may be seen in Figure 1.

After leaving oven 52 the mandrels M approach a second dipping tank 55 that is shallower and considerably shorter than tank 42. Tank 55 is shown as having a bottom 56, a rearward end 57, and a forward end 58, although it will be understood that it can be the same as tank 42 if desired. A portable tank 59 mounted on wheels 60 contains a dispersion D-1, and has a valved outlet 61 and coupling 62 that permits a removable connection to a pipe 64. Pipe 64 has a control valve 65 positioned therein that extends to the rearward end 57 of tank 55. A pipe 66 leads from the forward end of dipping tank 55 to a pump 67 and then to a cooler 68 connected by a pipe 69 to a filter 70. Dispersion D-1 is discharged from filter 70 through a pipe 71 and back to a T connection 64a in pipe 64 to permit continuous circulation of dispersion D-1.

After passing through the second dip tank 55, the film coated mandrels M enter a second oven 80 where they are subjected to the final curing operation. Oven 80 has a rearward open end 81, and heated air A-2 is blown longitudinally and rearwardly through the oven to emerge through this open end. The movement of air A-2 is contra to that of the forwardly moving mandrels M. It will be apparent that the flow of heated air A-1 and A-2 over the tanks 42 and 55 respectively, results in some evaporation of extender from the dispersions D and D1. To compensate for this loss of extender, a small inverted container 84 filled with the extender used in dispersion D is connected by a tube 85 to tank 42 through a control valve 86. Valve 86 is adjusted to permit extender to flow into tank 42 at a rate just sufficient to replace the evaporated extender.

An identical container 84', tube 85', and valve 86' are provided for tank 55 which permit the extender in dispersion D-1 in tank 55 to be replenished as evaporated due to the action of heated air A-2. Should the evaporated extender not be replenished, it will be apparent that the viscosity of the dispersions in tanks 42 and 55 would increase, resulting in dipped articles of non-uniform quality. The viscosity of dispersions D or D-1 can be varied at will either by adding more extender or fresh dispersion of a higher or lower viscosity.

Mandrels M, after traversing through oven 80, enter a cooling area C where the temperature of the film coated mandrels is lowered sufficiently to permit stripping thereof in the area S. The stripped overshoes are stacked, and removed to a suitable area in the plant for finishing and shipping. In my presently preferred process each of the mandrels is reheated after the stripping operation as it is returned to the dip tank 42 where the above described sequence of operations is repeated.

The successful dipping of an overshoe is dependent on using the dipping and curing apparatus in such a manner that each mandrel is moved and positioned relative to the dispersions D and D-1 under such conditions that the physical variables involved in the process are in a constant state of balance and cooperate to form an overshoe of the desired qualities both as to appearance and wearing qualities. The physical variables involved in the process include the temperature of the mandrel at various stages in the process, the temperature of the room as well as that of the dispersions D and D-1, the velocity at which the dispersions flow in the dipping tanks, the velocity of longitudinal movement of a mandrel through the dispersions, the velocity and degree of angulation as the mandrel enters and is withdrawn from the dispersion, the solid content of the dispersion, the viscosity of the dispersion, the specific gravity of the dispersion, the curing and drying temperatures, and the length of time the film is exposed to these temperatures.

Although at least ten different physical variables are involved in the process, it is possible to establish a condition of equilibrium in which these variables are all in balance as the constantly moving mandrels pass through a predetermined and unvarying sequence of events constituting the cycle of operation. As a result of this uniformity and established pattern, each mandrel and the film deposited thereon is under identical physical conditions in traversing this cycle. The human element is substantially eliminated by the use of my process other than maintaining liquid levels in the dipping tanks within certain prescribed ranges, and the temperature of the air A-1 and A-2 between certain minimum and maximum limits. As a result, when once set up and placed in operation, the process and equipment may be supervised by a person having a minimum of technical training. However, until the physical variables involved have been correlated and brought into balance it will be apparent that the presence of a person having an extensive knowledge of dipping operations will be essential.

In Figure 1 the sequence of positions assumed by a mandrel in passing through a complete dipping cycle is graphically disclosed, with the letter "M" having a numerical suffix affixed thereto at each of these positions for purposes of descriptive clarity. Each mandrel M just prior to entering the first dip tank 42 assumes a tilted angular position M-1, with its heel portion 22 facing forwardly and downwardly toward the tank. The mandrel is moved through positions M-2, M-3 and M-4 at a rapid and substantially uniform rate until it reaches position M-5. However, the velocity of the mandrels must be limited to the extent that no appreciable disturbance or wave action is imparted to the dispersion as the mandrels enter and are propelled therethrough. When waves or ripples are created in the bath they are reflected back and forth longitudinally in the tank 42, resulting in defectively formed films on the mandrels and thus imperfect goods. At position M-5 the heel portion 22 is just beginning the withdrawal from dispersion D, and as it is desirable to have maximum wall thickness on the heel portion of the overshoe, the speed of withdrawal of the mandrel is accelerated from position M-5 to that of M-6 as shown in phantom line.

To appreciate the reason why an accelerated withdrawal of the mandrel results in the formation of a thicker deposited film, we will here consider, for example, the formation of a film using a heated mandrel and a dispersion of polymerized vinyl resin particles.

Each of the mandrels M is returned to the position M-1 after completion of the stripping operation and the required temperature of the mandrel is adjusted during this return trip as necessary for its M-1 position. In the present form of the invention it has been found desirable to have the mandrels at a temperature from 150° to 210° F. in the M-1 position, and the temperature of the dispersion in the rearward end of tank 42 between 70° and 85° F.

When it is immersed in the dispersion D each heated mandrel M comes into contact with a number of resinous particles P. As may be seen in Figure 5, each of the particles includes a solid core 70 of the resin that has an expanded outer surface 71 of jelly-like consistency. As mandrel M is propelled through bath D in tank 42 the heat of the mandrel causes consecutive layers of particles P to build up thereon, the expanded surface portions of each layer of particles increasing in rigidity and physical strength due to the drying action of the heated mandrel. However, only a relatively thin skin 73 of semi-dried particles P (indicated by darker lines in Figure 5) builds up in this manner, as the resin particles are poor heat conductors. When the mandrel M is withdrawn between positions M-5 and M-6 (Figure 1), the skin 73 has already formed. During this withdrawal the film F formed on the mandrel is subjected to the heating effect of hot air A-1 that blows rearwardly over dip tank 42 as shown in Figures 1 and 11. The hot air A-1 creates the formation of a second skin 74 slightly above the surface of dispersion D. It will be noted that as skin 74 starts to form, the particles P are substantially their full size but as the heating continues the outer jelly-like portion 71 contracts in size to reach a minimum thickness at point 74'. During the contraction of particles P two opposing forces are at work. The tensile strength of each of the particles is increasing, but due to their contraction each particle is subjected to a gradually increasing force tending to separate it from the particles to which it is bonded.

It will be apparent therefore, that the point 74' is the weakest point in the second film 74, and accordingly the rate of withdrawal of mandrel M and the temperature A–1 must be so adjusted that the tensile strength of the particles increases faster than that of the force tending to cause their separation. In the event the rate of withdrawal of mandrel M and the heating by air A–1 are not properly correlated a rupture will occur in zone 74' and result in an imperfect dipped article. The withdrawal of mandrel M and the heating of film F by air A–1 as well as heat from the mandrel, results in the gradual approach of films 73 and 74 until the film assumes the solid state at point 75.

The thickness of the film F deposited on the mandrel M as it is withdrawn from dispersion D is the result of two opposing forces when other factors are constant. If the mandrel is withdrawn rapidly between positions M–5 and M–6, and the dispersion D has a sufficiently high viscosity, the inability of the dispersion to flow rapidly will cause a layer 76 of fluid dispersion to be carried upwardly between skin 74 and skin 73 which form a shell within which the fluid layer 76 is disposed.

It will be apparent that if the mandrel is moved more slowly between the positions M–5 and M–6 less of the dispersion layer 76 will be carried upwardly by movement of the mandrel. Thus, it will be seen that the thickness of the deposited film is dependent on a number of physical conditions. First, the viscosity of the dispersion must be sufficiently high that the upward movement of the mandrel M exerts a sufficient upward force thereon to temporarily overcome the force of gravity tending to cause it to remain in the dispersion in tank 42. The dispersion must also have the physical property of quickly forming the skin 74 to hold the liquid layer 76 between it and the mandrel. Likewise the layer 76 must have the property of becoming increasingly less fluid due to the heat from mandrel M and air A–1 during withdrawal from the dispersion in order that the static head of the layer 76 will not be sufficiently great to cause the rupture of the newly formed skin at zone 74'.

The manner in which the heel portion of the deposited film designated 22' is formed, is clearly illustrated in Figure 6. The withdrawal movement of mandrel M after reaching the M–6 position is slowed down so that less material is carried up in layer 76 against the retentive forces of gravity and surface tension of the dispersion evidenced by the meniscus 78 (Figure 6). After the mandrel has reached position M–6, its forward longitudinal and upward movement is so regulated that the sole 20' of the film always remains in a position parallel to the position occupied in Figure 8 until the mandrel is completely removed from dip tank 42.

From position M–6 the mandrel proceeds through positions M–7 and M–8 to the M–9 position where the toe portion 23' of the film is just being withdrawn from dispersion D. An enlarged view of the mandrel at position M–8 is shown in Figure 8 and at M–9 in Figure 9. The toe portion 23 of the mandrel is of gradually decreasing size, and permits the mandrel to be withdrawn from the dispersion with a minimum of disturbance due to the surface tension of the dispersion.

In Figure 9 it will be seen that the film F is making the final break with dispersion D which results in the formation of a thin tip or stringer 79. This tip should be as small as possible, and to completely separate it as rapidly as possible from the dispersion the speed of flow of the dispersion D in tank 42 is increased above that of the mandrel at position M–9. A ratio of 1½ to 1 between the rate of flow of the dispersion D and the rate of movement of the mandrel has been found satisfactory.

The dispersion D in tank 42 is in constant circulation toward the forward end thereof and at substantially the same rate of flow as the longitudinal speed of movement of the mandrels M up to a point at substantially M–7 to M–8. Such flow permits the formation of skin 74 on the mandrel with a minimum of disturbance as there is but little if any actual relative movement between the mandrel and the dispersion D until such time as the mandrel reaches the position M–8.

The circulation of dispersion D minimizes the forming of solidified skin on the upper surface of the dispersion due to the drying action of heated air A–1, and also permits the liquid to be cooled and filtered to an always uniform condition. Thus, each mandrel M is subjected to identical dipping conditions when it reaches the position M–1. From experience it has been found desirable to have the dispersion D flow between 14 and 24 inches per minute, with the mandrels moving horizontally at approximately this rate, and withdrawn from the dispersion at a rate sufficient to form the proper thickness of film.

When the mandrels reach the M–10 position in the present embodiment of the invention, they are at a temperature of approximately 100° F., and are just ready to enter the rearward open end of oven 52. In moving from the M–10 position to that of M–11 the mandrels are subjected to approximately a 50° change in temperature, as the temperature of air A–1 at this position is substantially 150° F. Since it is desirable to cure the overshoes as rapidly as possible, the various factors should be correlated to allow as high an air temperature in the oven as is consistent with good quality. However, too rapid curing results in blisters. The mandrels pass through positions M–12, M–13 in oven 52 and are subjected to a maximum temperature in the neighborhood of 360° F. at the forward end thereof. The temperature in oven 52 is sufficient to expel the hydrocarbon extender present in the deposited film and to fuse the vinyl resin and plasticizer into a homogeneous unified resilient sheet material. As may be seen in Figure 1, oven 52 may be provided with a stack 52a that withdraws a portion of hot air A–1 and all of the vaporized extender expelled during the curing process.

After leaving the M–14 position the mandrels are moved to the M–16 position which is substantially the same as position M–1. Pivotal movement of the mandrel takes place from the position M–16 to that of M–19 with substantially uniform motion, but with only the sole portion of the mandrel immersed in dispersion D–1 to impart the reinforcing layer 90 shown in Figures 7 and 10 to the formed overshoe. Motion of the mandrel is accelerated from position M–19 to that of M–20 to obtain a second heel portion 22' of greater thickness in the same manner as the first thickened heel portion was obtained.

After reaching position M–20 the mandrel is raised upwardly from dispersion D–1 through positions M–21 to M–24 in the same manner as that of positions M–7 to M–10. Dipping in tank 55 may be carried out at a higher temperature than in tank 42. The incoming dispersion D–1 is preferably at a temperature of approximately 85° to 90° F., and the mandrels at 240° to 250° F.

When the mandrels reach position M–24 they pass immediately into oven 80 and are subjected at the rearward end thereof to a temperature of approximately 225° to 275° F. when disposed in position M–25. Forward movement of the mandrels to position M–28 results in their being subjected to increasing temperature which reaches a maximum curing temperature of 350° to 400° F. At this temperature the vinyl resin and plasticizer are fused into a uniform homogeneous film in the form of an overshoe, as shown in Figure 7. At position M–29 the mandrel is in the cooling area where its temperature is reduced to approximately 150° F. Movement of the mandrel continues and at position M–34 the cured overshoe is stripped from the mandrel. Each stripped mandrel M is returned to position M–1, with the temperature of the mandrel being adjusted between positions M–36 and M–1 for the particular dispersion D being used.

In practice it has been found desirable to use a dispersion D-1 in the second dipping operation that provides a film 90 of greater hardness and toughness, and which is more resistant to abrasion and cutting action than that afforded by the dispersion D. However, this procedure is optional and the same dispersion may be used if desired. Likewise the overshoe may be formed by a single dip with the entire sole portion 20 thereof thickened by an acceleration in rate of withdrawal of the mandrel from the positions M-6 to M-9; or with the heel very thick and the balance of the sole medium thick. Should it be desired, the overshoe may be formed with the sole 20', upper portion 21', heel 22', and toe 23' of uniform wall thickness by drawing a mandrel M through dispersion D at a constant rate from position M-1 to position M-9. Thus, it will be seen that my process provides a maximum of versatility in that hollow articles may be formed with uniform wall thickness or with certain portions of the walls thickened for reinforcing purposes, and that they in whole or in part may have a second layer deposited thereon that is of either constant or varying wall thickness.

A portion of an apparatus successfully used in carrying out the invention is shown in Figure 11. A relatively wide, approximately sixteen inch, flexible endless belt B of a heat resistant material such as saw band steel is provided. The band B is movably supported on suitable roller means (not shown) in a configuration to support the mandrels M as they progress through the sequence of positions shown in Figure 1.

The belt B has a number of longitudinally spaced pairs of bearings 100, each of which rotatably supports a transversely positioned shaft 101. Two laterally spaced hangers 102 depend downwardly from each of the shafts 101, and have bearings 103 supported on the ends thereof in which one of the rods 26 shown in Figure 2 is journaled. Each rod 26 preferably supports three laterally spaced mandrels M, as may be seen in Figure 11.

The ends of rods 26 project through bearings 103 and rest on two laterally spaced guide rails 104 that provide an endless path. Guide rails 104 serve to adjust the mandrels M to the desired elevation as they progress through the sequence of positions shown in Figure 1.

Each group of mandrels M mounted on one of the rods 26 has a horizontally disposed rod 106 rigidly affixed to the upper portions 21 above the dip line thereof. The outer ends of each rod 106 movably engage two laterally spaced endless guide rails 107 that generally follow the contour of rails 104. Rails 107 cause the desired pivotal movement of the mandrels M such as occurs between positions M-1 and M-6. It will be apparent that as rails 107 are caused to approach rails 104, pivotal movement of the mandrels M will take place in a clockwise direction, and as the rails 104 and 107 depart from one another, pivotal movement of the mandrels takes place in a counterclockwise direction. Of course, when the rails 104 and 107 are parallel the mandrels M are held in a fixed position such as occurs between positions M-11 and M-14.

The belt B, in addition to serving as a support for the mandrels M, also defines a longitudinally extending passage over dip tanks 42 and 55 to direct the hot air currents A-1 and A-2 rearwardly for film drying purposes, and particularly to assist in the formation of film or skin 74 and also to permit faster drying in the oven.

Figure 5 illustrates the formation of film F wherein the mandrel was heated prior to the dipping operation, but with some dispersions an unheated mandrel can be used. Likewise, it is possible to use a dispersion that includes only the resin particles and a plasticizer that is so constituted that almost immediate solidification of the film F occurs as the mandrel is raised from the dispersion. Dispersions of this type are generally known as Plastisols, and it will be appreciated that when this type of dispersion is used, the heating of the film must be handled differently. Plastisols are essentially a special type of organosol as distinguished from hydrosols, and wherever in the specification or claims the term "organosol" is used, it is to be construed in its broad sense as a sol in which both the inner and outer phases are organic materials.

Although the process herein described is fully capable of achieving the objects and providing the advantages hereinbefore mentioned, it is to be understood that it is merely illustrative of the preferred form of my invention and that I do not mean to limit myself to the details of the described process other than as defined in the appended claims.

I claim:

1. The method of continuously forming hollow one-piece articles that comprises: moving a mandrel longitudinally through a bath of heat curable resinous dispersion to dip said mandrel to the desired depth; withdrawing said mandrel from said bath at a rate of such magnitude as to deposit a film of said dispersion of the desired thickness on said mandrel; subjecting said mandrel and film deposited thereon to an elevated temperature to form a dried skin on the exterior surface of said film substantially as said film is removed from said bath, said skin having sufficient tensile strength to maintain the dispersion forming said film in a relatively fixed position relative to said mandrel until said film solidifies due to said elevated temperature; continuously circulating said bath at a rate substantially the same as the rate of longitudinal movement of said mandrels to minimize disturbance of said film as said mandrel is withdrawn from said bath; subjecting said film and mandrel to sufficient heat to further cure said film; and stripping said cured film from said mandrel.

2. The method of forming a one-piece dipped overshoe by a continuous cycle of operations which comprises: angularly positioning a shoe-shaped mandrel with its heel portion facing forwardly and downwardly above an elongated bath of a heat curable resinous dispersion that is flowing forwardly at a given rate; moving said mandrel forwardly and downwardly into said dispersion to deposit a film thereon with a minimum of disturbance to said dispersion, with said mandrel then being withdrawn from said bath in a tilted toe downwardly position to prevent surplus dispersion being disposed on said film, said mandrel during said withdrawing operation being advanced forwardly at substanially the same rate said dispersion is flowing to avoid deformation of said film; varying the relative rate of movement between said dispersion and said mandrel just prior to said mandrel separating from said bath to minimize the formation of stringers on said film; maintaining a heated blanket of air above said bath to stabilize said film on said mandrel as said film is withdrawn from said bath; moving said mandrel and stabilized film into a confined space of elevated temperature to completely cure said film; and bonding a second layer of resinous material to the sole portion of said film for reinforcing purposes.

3. The method of forming a one-piece dipped overshoe by a continuous cycle of operations which comprises: angularly positioning a heated hollow shoe-shaped mandrel formed from a metallic heat conducting material above an elongated bath of a resinous dispersion that has its viscosity and drying characteristics so adjusted that a film of substantial thickness will adhere thereto when a heated mandrel is withdrawn from said dispersion; moving said mandrel forwardly and heel downwardly into said bath to deposit a film thereon with a minimum of disturbance to said dispersion, with said mandrel then being withdrawn from said bath in a tilted toe downwardly position to prevent surplus dispersion being deposited on said film, said mandrel during said withdrawal being advanced forwardly and said dispersion being caused to flow forwardly at such a rate that there is substantially no relative horizontal movement between said mandrel and bath to damage said film as it is withdrawn from said dispersion; varying the relative rate of movement between said dispersion and said mandrel just prior to said film separating from said bath to minimize the formation of irregularities on said film; blowing a stream of heated air rearwardly over said bath during said dipping operation to heat the interior and exterior of said mandrel to stabilize said film in a minimum amount of time; moving said mandrel and stabilized film into a confined space of elevated temperature to completely cure said film; and stripping said cured film from said mandrel.

4. A method of continuously forming a one-piece plastic article that comprises: dipping a heated mandrel in a bath of a dispersion capable of depositing a film thereon the thickness of which is proportional to the rate at which said mandrel is withdrawn up to a predetermined maximum; withdrawing a portion of said mandrel from said bath with both vertical and horizontal motions at a first rate to deposit the portion of film that is to be of one thickness and withdrawing another portion of said mandrel from said bath at another rate to form another portion of said film of a different thickness; subjecting said film to an elevated temperature as said mandrel emerges from said bath to quickly form a skin that holds said film in a fixed position on said mandrel; circulating said bath as said mandrel is withdrawn at such a rate that there is substantially no relative horizontal movement between said mandrel and bath during the film forming operation; accelerating the rate of circulation of said bath at a position just prior to said mandrel being separated therefrom to minimize the size of any irregularity that may be formed in said film as it is separated from said bath; further curing said film by moving said mandrel into a localized area of elevated temperature; and stripping said film from said mandrel.

5. The method of forming a plurality of one-piece dipped overshoes of the desired wall thickness that comprises: disposing a plurality of hollow metallic overshoe shaped mandrels in sequence in a tilted position over the rearward end of a bath of a resinous dispersion capable of depositing a film of substantial thickness on a mandrel withdrawn therefrom; dipping each of said mandrels into said bath with a forward and downward motion to minimize formation of a wave action on the surface of said dispersion that would adversely affect films deposited on mandrels being withdrawn from said bath; withdrawing each of said mandrels in a tilted position from said bath with an upward and forward movement of such velocity as to deposit a film of the desired thickness, said bath being circulated forwardly at substantially the same forward rate as said mandrel to prevent damage to said film as it is withdrawn from said bath; blowing a stream of hot air rearwardly over said bath to heat the interior and exterior of each of said mandrels to an elevated temperature that is sufficient to cause the formation of said skin on said film; further heating said mandrels to completely cure said film deposited thereon; and bonding a second film to the sole portion of said first film.

References Cited in the file of this patent

UNITED STATES PATENTS

| | | |
|---|---|---|
| 826,258 | Lakin | July 17, 1906 |
| 1,825,738 | Klein | Oct. 6, 1931 |
| 1,828,990 | Watkins | Oct. 27, 1931 |
| 1,983,667 | L'Hollier | Dec. 11, 1934 |
| 2,041,788 | Sprunger | May 26, 1936 |
| 2,299,269 | Gammeter | Oct. 20, 1942 |
| 2,437,109 | Maguat | Mar. 2, 1948 |